UNITED STATES PATENT OFFICE.

GEORGE A. BALZ, OF RAHWAY, NEW JERSEY.

CARBORUNDUM ARTICLE AND THE PROCESS OF MAKING IT.

1,217,683. Specification of Letters Patent. Patented Feb. 27, 1917.

No Drawing. Application filed January 28, 1916. Serial No. 74,741.

*To all whom it may concern:*

Be it known that I, GEORGE A. BALZ, a citizen of the United States of America, residing in Rahway, in the county of Union and State of New Jersey, have invented certain new and useful Improvements in Carborundum Articles and the Processes of Making Them, of which the following is a specification.

This invention relates to carborundum for use as a refractory or chemical-resistant material.

The form of carborundum most commonly employed for refractory purposes is firesand or modifications thereof, being the material taken from the carborundum furnace outside of the crystalline zone and consisting mainly of amorphous carborundum or of silicon-carbid resulting from the partial reduction of silica by carbon at the intense heat of the electric furnace. It may be used either in crystalline form or in amorphous form. For refractory material or linings this carborundum is applied with some suitable binder, sodium silicate or ground fireclay, or both, being commonly used.

Carborundum articles are also made of powdered or granulated carborundum (or preferably for cheapness carborundum firesand) united by a binder of either sodium silicate or ground fireclay in water. The mixture in a plastic condition is either pressed or molded to any shape required, and is then baked to expel the water. Carborundum articles are also made by pressing the grains or powder of carborundum of suitable size into the shape desired, which may be the shape of a finished article; this mass so molded or pressed is then heated in an electric furnace to or about the temperature originally used to produce the carborundum.

The present invention aims to provide a better and more refractory carborundum article, and one which can be produced at the minimum of expense.

According to the present invention, powdered or granulated carborundum (preferably for cheapness in the form of carborundum firesand) is mixed with a small proportion of the hydrate of a suitable alkali earth metal and sufficient water to render the entire mass sufficiently plastic. Of such hydrates, lime is the only one cheap enough to be admissible. Proper results are secured by the addition to 98 parts by weight of carborundum firesand or other form of crystalline or amorphous carborundum, of calcium hydrate corresponding to two parts by weight of CaO. The lime should be slaked in the ordinary manner and sufficient water added to bring it to the proper consistency. The lime cream is then worked into the firesand by suitable means, and if the mass is not sufficiently plastic for proper molding or pressing additional water may be added.

The plastic mass is then pressed or molded into any desired shape by means of any ordinary press or otherwise, and the articles so pressed or molded are then dried in the same manner as clay or silica bricks. The articles are then burned or calcined at the temperature ordinarily employed in the refractory arts. This temperature is preferably 1400° C. or somewhat higher.

This burning calcines the hydrated lime to CaO, which remains in sufficient proportion and in sufficiently intimate union with the particles of carborundum to aggregate the latter into a cohesive mass. The baking or burning temperature is preferably such as to frit or flux the mass.

The bricks, shapes and other articles thus produced are extremely refractory, and well adapted for use in the lining or other parts of all forms of furnaces or other apparatus where extremely high temperatures are generated, or where chemical conditions may be such that neither aluminous nor silicious materials may be used.

As the term is used in this specification calcined lime is that form of CaO which results from the calcination of calcium hydrate (or carbonate), whereby it is rendered anhydrous and becomes a dense, solid coherent body. In my product this calcined lime exists in such minute proportion and so distributed that it apparently incases the particles of carborundum and fills the intervening voids, so that it has a highly efficient cementive effect.

I claim as my invention:—

1. The described process of producing carborundum articles, consisting in mixing with powdered or granulated carborundum the hydrate of an alkali earth metal and water, molding or pressing and drying the mixture, and baking it at a temperature sufficient to calcine the hydrate, thus producing a dense coherent body.

2. The described process of producing carborundum articles, consisting in mixing with powdered or granulated carborundum, calcium hydrate and water, molding or pressing and drying the mixture, and baking it at a temperature sufficient to calcine the hydrate, thus producing a dense coherent body.

3. The described process of producing carborundum articles, consisting in mixing with powdered or granulated carborundum, calcium hydrate and water, molding or pressing and drying the mixture, and baking it at a temperature sufficient to calcine and frit the hydrate, being a temperature materially below that which is required for the original formation of silicon-carbid.

4. The described carborundum articles, consisting of granulated or powdered carborundum and a binder of a small portion of calcined lime.

5. The described carborundum articles, consisting of granulated or powdered carborundum and a binder of calcined lime in fritted or fluxed condition.

In witness whereof, I have hereunto signed my name in the presence of two subscribing witnesses.

GEORGE A. BALZ.

Witnesses:
  M. E. GRAY,
  C. VON HARTZ.